United States Patent [19]

Park

[11] Patent Number: 6,144,850
[45] Date of Patent: Nov. 7, 2000

[54] REAL-TIME MONITORING OF REMOTE BASE STATION TRANSCEIVER SUBSYSTEMS

[75] Inventor: Young-Chul Park, Seoul, Rep. of Korea

[73] Assignee: Samsung Electronics Co., Ltd., Suwon, Rep. of Korea

[21] Appl. No.: 09/123,863

[22] Filed: Jul. 28, 1998

[30] Foreign Application Priority Data

Jul. 28, 1997 [KR] Rep. of Korea ................ 97-35405

[51] Int. Cl.[7] .................... H04M 3/00; H04B 17/00
[52] U.S. Cl. .................... 455/419; 455/560; 455/423; 455/67.1; 370/342
[58] Field of Search ................. 455/419, 420, 455/418, 466, 461, 561, 560, 423, 67.1; 370/441, 479, 342, 335

[56] References Cited

U.S. PATENT DOCUMENTS

| | | | |
|---|---|---|---|
| 5,627,878 | 5/1997 | Strauch et al. | 455/466 |
| 5,675,371 | 10/1997 | Barringer | 455/420 |
| 5,696,901 | 12/1997 | Konrad | 709/203 |
| 5,943,425 | 8/1999 | Mizikovsky | 455/419 |
| 5,974,312 | 10/1999 | Hayes, Jr. et al. | 455/419 |
| 6,052,600 | 4/2000 | Fette et al. | 455/418 |

*Primary Examiner*—Nguyen Vo
*Assistant Examiner*—Eliseo Ramos-Feliciano
*Attorney, Agent, or Firm*—Dilworth & Barrese, LLP

[57] ABSTRACT

A system and method is provided for monitoring remote base station transceiver subsystems (BTSs) in a concurrent real-time operating system (CROS) environment in a code division multiple access (CDMA) or a personal communication service (PCS) system. The method includes the steps of transmitting remote control information including a designated identification (ID) to a target call control processor (CCP) from a source call control processor. A confirmation message is sent to the source CCP from the target CCP, when the designated ID of the remote control information matches control information associated with the target CCP. A remote control command is transmitted to the target CCP in accordance with the confirmation message. Response information is prepared in the target CCP in response to the remote control command. An inter-process communication message buffer is assigned as a print buffer for serial transmission of the response information, by controlling a shell of the CROS. The serial response information is outputted to an indicator device associated with the source CCP.

14 Claims, 2 Drawing Sheets

300

REAL-TIME MONITORING OF REMOTE BASE STATION TRANSCEIVER SUBSYSTEMS

BACKGROUND OF THE INVENTION

1. Field of the Invention

The present invention relates to Code Division Multiple Access (CDMA) and Personal Communication Service (PCS) systems and, more particularly, to a method and system for monitoring remote base station transceiver subsystems (BTSs) in a Concurrent Real-time Operating System (CROS) environment in a CDMA or PCS system.

2. Description of the Related Art

Typically, the operating system (OS) of a CDMA or PCS system is a Real-time Multi-tasking Operating System (RMOS) which does not include a layer for interfacing the OS with a user application layer. As such, the monitoring of remote BTSs of a CDMA or PCS system is performed in a peripheral processor. That is, when a user desires to view the output messages of a remote BTS in order to remotely monitor the BTS, the user must command the OS to transmit the messages to a print buffer via a serial channel.

In contrast, a command-independent CROS has a shell layer (shell) for interfacing a CROS kernel with the user application layer. However, the shell is not able to process the output messages of a remote base station controller (BSC) and BTS without a specific instruction on the shell. In a CROS environment, since the shell does not include a routine for handling the output messages of remote BTSs, non-peripheral processors are unable to view the output messages. Accordingly, there is a need for registering a specific routine to the shell for monitoring remote BTSs in a CROS environment.

U.S. Pat. No. 5,696,901 to Konrad, issued on Dec. 9, 1997, discloses a system for providing a variety of functions including remote monitoring. The system includes nine logical components and three physical components (a local host computing system, a remote host computing system, and an intervening network). The U.S. Pat. No. 5,696,901 patent discloses a system which performs various functions through software maintenance, such as monitoring the local host and the remote host connected by the network. However, the patent does not disclose a method for directly receiving output messages from a processor of a remote BTS through an inter-process communication (ipc) message buffer to a different processor connected by the network.

SUMMARY OF THE INVENTION

It is an object of the present invention to provide a method and system for monitoring remote BTSs operating in a Concurrent Real-time Operating System (CROS) environment in a CDMA or PCS communication system.

It is another object of the present invention to provide a method and system for registering a routine in the shell of a CROS of a target processor that supports remote monitoring and performs limitless monitoring jobs initiated by a dispatcher.

According to one aspect of the invention, a method is provided for monitoring remote base station transceiver subsystems (BTSs) in a concurrent real-time operating system (CROS) environment in a code division multiple access (CDMA) system or a personal communication service (PCS) system. The method includes the steps of: transmitting remote control information including a designated identification (ID) to a target call control processor (CCP) from a source call control processor; sending a confirmation message to the source CCP from the target CCP, when the designated ID of the remote control information matches control information associated with the target CCP; transmitting a remote control command to the target CCP in accordance with the confirmation message; preparing response information in the target CCP in response to the remote control command; assigning an inter-process communication message buffer as a print buffer for serial transmission of the response information, by controlling a shell of the CROS; and outputting the serial response information to an indicator device associated with the source CCP.

According to another aspect of the invention, a system is provided for remotely monitoring base station transceiver subsystems (BTSs) in at least one of a code division multiple access (CDMA) and a personal communication service (PCS) system, the CDMA and PCS systems having a base station controller (BSC) network including BTSs and BSCs operating in a concurrent real-time operating system (CROS) environment. The system includes: a CROS of a source call control processor (CCP) for performing a remote control; a CROS of a target CCP for receiving a remote control command having a designated identification (ID) from said source CCP; an inter-process communication (ipc) message buffer for holding prepared response information in accordance with a result of verifying the designated ID of the remote control command and for being assigned as a print buffer; and means for assigning said ipc message buffer as the print buffer to support a serial transmission of response information, the response information responsive to the remote control command.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, wherein.

DETAILED DESCRIPTION OF PREFERRED EMBODIMENTS

The present invention is directed to a method and system for monitoring remote base station transceiver subsystems (BTSs) in a concurrent real-time operating system (CROS) environment in a code division multiple access (CDMA) system or a personal communication service (PCS) system. The remote monitoring, which is conventionally performed in a RMOS, can be performed according to the present invention in a CROS by registering a specific routine in the CROS of a target processor for processing signals transmitted to, and received from, remote BTSs and base station controllers (BSCs). As a result, a user can view output messages generated from remote BTSs and BSCs by registering the same command in the CROS as that employed in an RMOS. The output messages are viewed on a display associated with a source processor.

Figure 1:
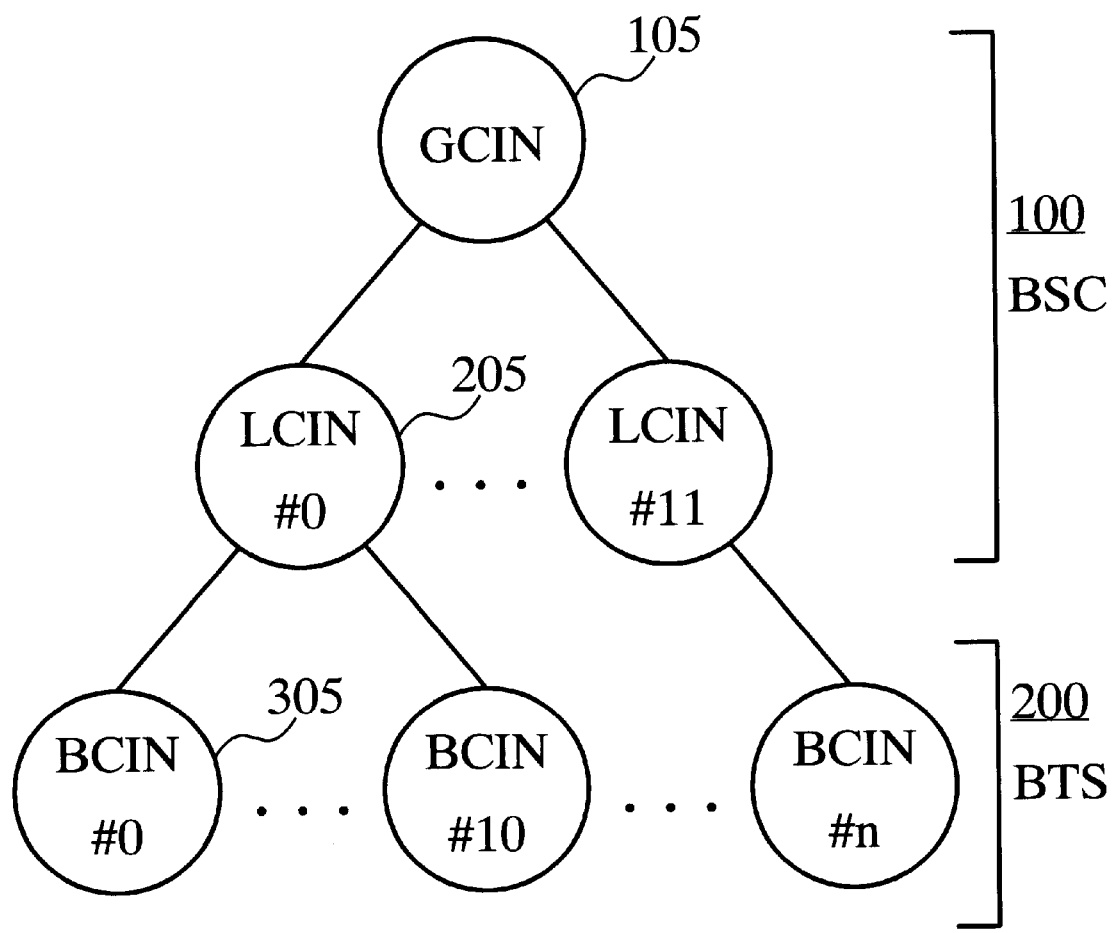
FIG. 1 is a schematic diagram of a BSC network in a code division multiple access (CDMA) or personal communication service (PCS) system.

FIG. 1 is a schematic diagram of a BSC network in a CDMA and PCS system. In accordance with the hierarchal arrangement of the BSC network, starting from the top of the hierarchy, a global communication interconnection network (GCIN) 105 is operatively connected to a number of local communication interconnection networks (LCINs) 205 which, in turn, are operatively coupled to a number of BTS communication interconnection networks (BCINs) 305. The GCIN 105 and LCINs correspond to a BSC 100, and the BCINs correspond to a BTS 200. In such a BSC network, a BSC has only one call control processor (CCP). The CCP is referred to as a master processor, and operates in a Concurrent Real-time Operating System (CROS) environment.

Figure 2:
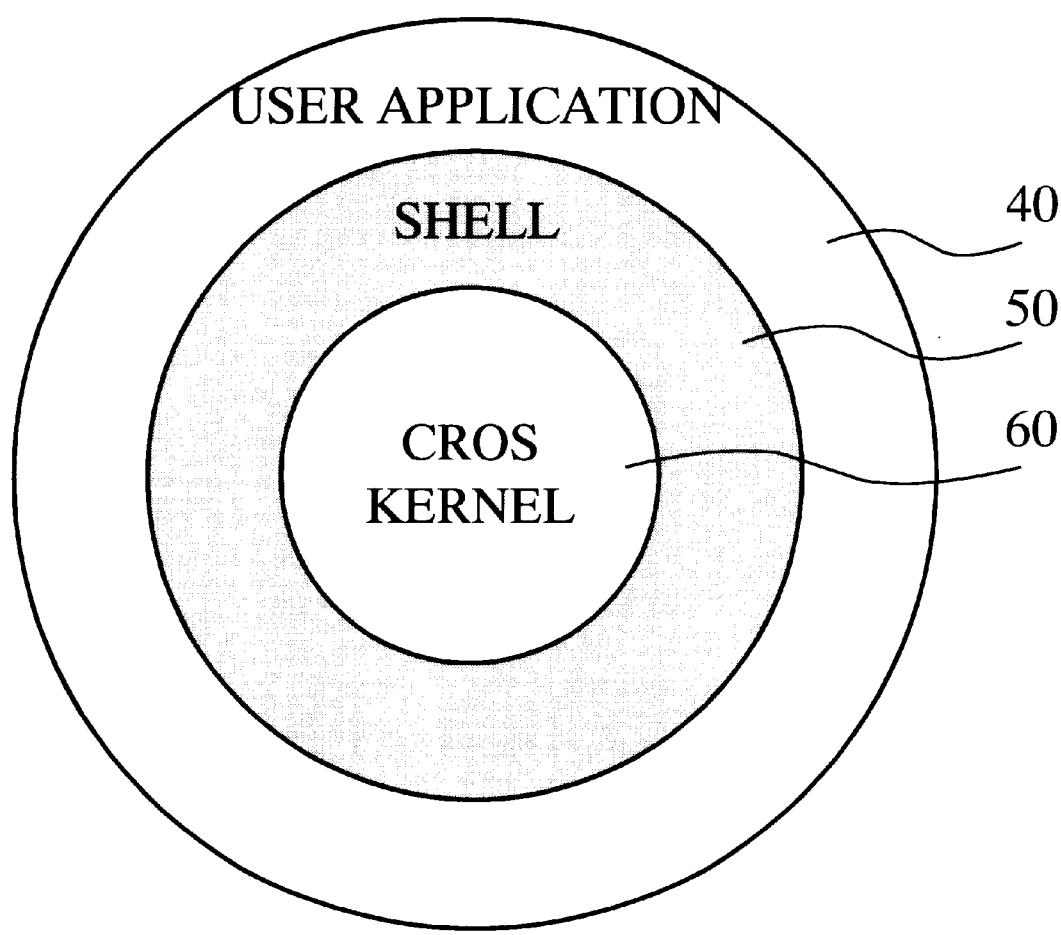
FIG. 2 is a schematic diagram of a concurrent real-time operating system (CROS) according to an embodiment of the present invention.

Referring to FIG. 2, a schematic diagram of a CROS according to an embodiment of the invention is shown. The CROS 300, which is the operating system of the BSC network shown in FIG. 1, includes a CROS kernel 60, a user application layer or block 40, and a shell level (shell) 50 for interfacing the CROS kernel and the user application layer.

User applications can use primitives predefined by the shell. One such primitive is a routine which interfaces a variety of debugging commands keyed-in to the operating system by a user. The object of the present invention is achieved by improvement of this routine.

When the CROS of a target CCP transmits messages from remote BTSs and BSCs to a serial channel, the shell of the CROS must include a routine for processing the messages. Additionally, the shell performs the following steps: interpreting commands keyed-in by users; recognizing the commands; determining whether a received message is a remote command; and making the commands operable in the shell.

In a preferred embodiment of the invention, CROS 300 is implemented in a MOTOROLA 68,000 family or equivalent type processor, e.g., the 68030 processor, which has the capability of processing 256 interrupt sources. An interrupt (s) between shell 50 and user application layer 40, which is generally referred to as trap no. 1, utilizes interrupt source No. 33. The shell 50 assigns 130 directive numbers to the trap No. 1 interrupts. The 130 directive numbers are distinguished in accordance with a value associated with a data register, specifically, data register No. 0. When a remote control (RC) command is inputted in response to a prompt, an interrupt handling routine in the shell assigns a directive number to the RC command as stated above. In accordance with the RC command, the operating system transmits an RC command start signal to a target processor, that is, a target CCP that a source CCP traces. The target CCP assigns and uses an inter-process communication (ipc) message buffer as a print buffer in order to send information regarding a BTS to a source CCP. Additionally, the target CCP transmits a remote control start confirm signal to the source CCP. The assignment of the ipc message buffer as a print buffer is performed by a control implemented in the shell of the CROS. The source CCP receives the remote control start confirm signal and displays the messages on a Cathode Ray Tube (CRT) associated with the source CCP. A remote control continues through a series of processes.

In the prior art, remote control can only be performed in peripheral processor and not in master processors. However, according to the invention, particularly with respect to interrupt handling and the transmission of monitoring information as described above, remote control is expanded to the entire BSC including a CCP.

Consequently, the output messages from all the BTSs in a CDMA or PCS system may be controlled regardless of the operating system employed. As such, an end-user can monitor any BTS and any BSC by simply connecting a debug port to a processor, regardless of whether or not the processor is operating in an RMOS or a CROS environment.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for monitoring remote base station transceiver subsystems (BTSs) in a concurrent real-time operating system (CROS) environment in one of a code division multiple access (CDMA) system and a personal communication service (PCS) system, said method comprising the steps of:

transmitting remote control information including a designated identification (ID) to a target call control processor (CCP) from a source call control processor;

sending a confirmation message to the source CCP from the target CCP, when the designated ID of the remote control information matches control information associated with the target CCP;

transmitting a remote control command to the target CCP in accordance with the confirmation message;

preparing response information in the target CCP in response to the remote control command;

assigning an inter-process communication message buffer as a print buffer for serial transmission of the response information, by controlling a shell of the CROS; and outputting the serial response information to an indicator device associated with the source CCP.

2. The method of claim 1, wherein said sending step further comprises:

determining whether the designated ID of the remote control information matches the control information of the target CCP, when the remote control information including the designated ID is transmitted from the source CCP to the target CCP.

3. The method of claim 1, wherein the indicator device is a display.

4. A system for remotely monitoring base station transceiver subsystems (BTSs) in at least one of a code division multiple access (CDMA) and a personal communication service (PCS) system, the CDMA and PCS systems having a base station controller (BSC) network including BTSs and BSCs operating in a concurrent real-time operating system (CROS) environment, the system comprising:

a CROS of a source call control processor (CCP) for performing a remote control;

a CROS of a target CCP for receiving a remote control command having a designated identification (ID) from said source CCP;

an inter-process communication (ipc) message buffer for holding prepared response information in accordance with a result of verifying the designated ID of the remote control command and for being assigned as a print buffer; and means for assigning said ipc message buffer as the print buffer to support a serial transmission of response information, the response information responsive to the remote control command.

5. The system of claim 4, wherein said CROS of the source CCP includes a shell for at least transmitting the remote control command.

6. The system of claim 4, wherein said CROS of the target CCP comprises:

a CROS kernel;

a user application block; and a shell for interfacing said kernel with said user application block.

7. The system of claim 4, wherein said BSC network is arranged in a predetermined hierarchical order and, starting from a top of the hierarchy and progressing downwards, comprises:
- a global communication interconnection network (GCIN);
- a plurality of local communication interconnection networks (LCINs); and
- a plurality of BTS communication interconnection networks.

8. The system of claim 4, wherein the base station transceiver subsystems associated with a respective base station controller (BSC) are controlled by a CCP associated with the respective BSC.

9. The system of claim 6, wherein said user application block uses primitives predefined by said shell.

10. The system of claim 6, wherein said shell interfaces a plurality of keyed-in debugging commands from a user to a routine processed by said CROS of the target CCP.

11. The system of claim 6, wherein said shell of said CROS of the target CCP transmits messages from remote BTSs and BSCs to a serial channel.

12. The system of claim 6, wherein said shell of said CROS of the target CCP analyzes commands inputted by a user.

13. The system of claim 12, wherein the commands are inputted by the user via a keyboard.

14. The system of claim 6, wherein said shell of said CROS of the target processor makes the remote control command operable, when a received message is confirmed as corresponding to the remote control command.

* * * * *